United States Patent Office 2,752,316
Patented June 26, 1956

2,752,316
ASPHALT COMPOSITIONS CONTAINING A SMALL AMOUNT OF CHLOROSULFONATED POLYETHYLENE

John A. Bolt and Joseph W. Van Wyk, Chicago, Ill., assignors to Standard Oil Company, Chicago, Ill., a corporation of Indiana No Drawing. Application September 2, 1954,
Serial No. 453,934

4 Claims. (Cl. 260—28.5)

Our invention relates to the production of modified asphalt compositions of improved flexibility and ductility, particularly asphalt compositions combining the property of ductility with high softening point as required for use in lining irrigation canals.

Supplying asphalts which combine the good flexibility and ductility required for use in lining irrigation canals with high softening point presents a problem to asphalt producers and formulators. The specifications to be met by standard ASTM tests established by the Bureau of Reclamation, Department of Interior, require a softening point (ring and ball) in the range of 175°–200° F. with a penetration at 77° F. of 50 to 70. The minimum ductility at 77° F. must be 3.5 and the solubility in carbon tetrachloride must not be less than 97.0%. Vacuum reduced or steam refined asphalts do not meet the required softening point. Although air blown, or oxidized, asphalts meeting the required specifications can be produced by use of a phosphorous pentoxide oxidation catalyst, the resulting products are often borderline with respect to the carbon tetrachloride solubility specification. The use of additives has been extensively investigated, but in general if the additive raises softening point, i. e., increases hardness, it causes a correlative decrease in ductility and vice versa.

We have now discovered that the incorporation of a small amount of a chlorosulfonated polyethylene in asphalt produces a significant improvement in flexibility and ductility. In the case of oxidized asphalts (and also solvent precipitated asphalts although they are more expensive), softening point may be increased and ductility improved to meet the specifications for irrigation canal asphalt lining compositions. The chlorosulfonated polyethylene is easily dispersed in the asphalt and may be incorporated either prior to or after oxidation.

The chlorosulfonated polyethylene may be incorporated in an asphalt with beneficial effect from very minor proportions up to as much as 10% by weight or more when incorporation of the additive becomes mechanically infeasible and/or uneconomic. From the practical standpoint, however, about 2 to 5% by weight of the chlorosulfonated polyethylene is most advantageous for improvement in the properties of flexibility, ductility, and softening point. In the case of the oxidized asphalts that we have worked with, which are derived from reduced Mid-Continent and Rocky Mountain type crudes, about 3% by weight of the additive appears to be optimum. Although the source of the asphalt does not appear to be significant in terms of susceptibility to improvement by incorporation of the chlorosulfonated polyethylene, oxidized asphalts produced by air blowing reduced crudes rather than asphalts produced from cracked residua seem to be most desirable. Typically, the asphalt may be blown with air at about 400°–500° F. and at an air rate approximating 32 cubic feet per minute of air per ton of charge. The additive may be incorporated before oxidation, but it is advantageous to incorporate it after oxidation. We have found that the additive is easily dispersed in the asphalt provided adequate mixing equipment is employed and a moderately elevated temperature is maintained. Thus it is desirable to maintain a temperature of about 400° F. or above although prolonged heating at elevated temperature in excess of 250° F. is to be avoided because of break-down of the chlorosulfonated polyethylene.

The following specific examples illustrate procedure for producing modified asphalts typical of the invention and provide data on their physical properties. In the examples, a chlorosulfonated polyethylene containing about 27.5% chlorine and 1.5% sulfur and having an average molecular weight of about 20,000 was employed. The particular material may be obtained in the trade under the name "Hypalon S–2." It is believed to have the following structure:

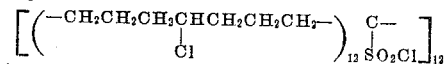

In the examples, the residum employed was a reduced Wyoming crude. The oxidation of the asphalt was carried out in a one gallon laboratory still at 450° F. and at an air rate of 1 cc. per minute per gram of asphalt. The chlorosulfonated polyethylene was added in bulk form (spongy clusters) directly to the hot asphalt. The additive dispersed readily in the asphalt at this temperature. In the first example, no additive was employed, and in Examples 2, 4, and 5 the additive was added before oxidation. After addition of the additive, the asphalt composition was blown to the desired softening point, i. e., in the range of 175°–200° F. In Example 3, the asphalt residum was blown for 1200 minutes to a softening point of 154° F. before the addition of the chlorosulfonated polyethylene. The data on the examples are tabulated below:

|  | Example | | | | |
|---|---|---|---|---|---|
|  | 1 | 2 | 3 | 4 | 5 |
| Amount of Additive Used, percent | None | 1 | 1 | 2 | 3 |
| Prior Oxidation Time (Min.) | None | None | 1200 | None | None |
| Softening Point, ° F. R. & B | 173 | 182 | 179 | 187 | 195 |
| Penetration at 77° F | 30 | 39 | 30 | 48 | 59 |
| Ductility at 77° F | 3.3 | 3.3 | 4.5 | 4.0 | 5.3 |
| Solubility in CCl₄, percent | 99.9 | 99.9 | 99.8 | 99.8 | 99.7 |

With initially harder asphalts, the incorporation of the chlorosulfonated polyethylene may cause appreciable increase in hardness as shown by increased softening point and decreased penetration. The pronounced hardening effect then may cause a decrease in ductility, but the asphalt can be blended back to a softening point of 175°–200° F. to obtain the desired improvement in ductility relative to softening point.

The asphalt compositions of our invention exhibit better ductility than competitive asphalts produced by air blowing in the presence of phosphorous pentoxide. The process of preparation is simpler; it is uncomplicated by catalyst settling problems and as a result, the carbon tetrachloride solubilities of the products are consistent and uniform. The products have special utility as irrigation canal liners.

We claim:

1. A modified asphalt composition which consists essentially of asphalt and a small amount not exceeding about 10% by weight of a chlorosulfonated polyethylene.

2. The composition of claim 1 in which the asphalt is an oxidized asphalt.

3. A modified asphalt composition which consists essentially of asphalt and about 2 to 5 weight per cent of a chlorosulfonated polyethylene.

4. A modified asphalt composition which consists essentially of oxidized asphalt and about 3 weight per cent of a chlorosulfonated polyethylene.

References Cited in the file of this patent

UNITED STATES PATENTS 2,416,060    McAlevy et al. _____ Feb. 18, 1947